United States Patent [19]

Kitahara et al.

[11] 4,412,031

[45] Oct. 25, 1983

[54] MODIFIED RUBBER COMPOSITION EMPLOYING A COMPOUND CONTAINING A CARBOXYL AND AN ALDEHYDE GROUP

[75] Inventors: Shizuo Kitahara, Kawaguchi; Yoshitsugu Hirokawa, Yokohama; Haruki Kawada, Yokohama; Toshihiro Fujii, Yokohama; Nagatoshi Sugi, Yokohama; Hiroaki Hasegawa, Yokohama; Akira Yoshioka, Kamakura, all of Japan

[73] Assignee: Nippon Zeon Co., Ltd., Tokyo, Japan

[21] Appl. No.: 467,764

[22] Filed: Feb. 18, 1983

[51] Int. Cl.³ .......................... C08F 8/28; C08K 3/04
[52] U.S. Cl. .................................. 524/526; 260/756; 260/762; 524/511; 524/512; 524/572; 525/154; 525/262; 525/301
[58] Field of Search ............... 524/511, 512, 572, 526; 525/154, 301, 262; 260/756, 762

[56] References Cited

U.S. PATENT DOCUMENTS

| 3,236,917 | 2/1966 | Natta et al. ........................ 525/301 |
| 3,301,822 | 1/1967 | Dalibor et al. .................... 525/154 |
| 3,519,627 | 7/1970 | Coats et al. ....................... 528/254 |
| 3,597,313 | 8/1971 | Williams et al. ..................... 525/61 |
| 3,853,801 | 12/1974 | Tominaga et al. ................. 525/301 |
| 3,872,000 | 3/1975 | Hamada et al. .................... 528/230 |
| 4,005,053 | 1/1977 | Briggs et al. ....................... 524/533 |
| 4,032,629 | 6/1977 | Osberghaus ......................... 424/73 |
| 4,097,551 | 6/1978 | DiGiulio et al. ................... 525/301 |
| 4,100,137 | 7/1978 | LeMieux et al. .................. 525/154 |
| 4,326,576 | 4/1982 | Mizumoto et al. ................ 524/511 |

FOREIGN PATENT DOCUMENTS

| 57-55902 | 4/1982 | Japan ................................. 525/154 |
| 787419 | 12/1980 | U.S.S.R. ........................... 525/154 |

OTHER PUBLICATIONS

Derwent Abst. 12761, V/07, (2–1974), (NL 7310573).
Derwent Abst. 32886, C/19, (4–1980), (DT 2845569).

*Primary Examiner*—John C. Bleutge
*Assistant Examiner*—Herbert J. Lilling
*Attorney, Agent, or Firm*—Sherman & Shalloway

[57] ABSTRACT

A modified rubber composition comprising a blend of (a) a modified rubber obtained by reaction a rubber having an unsaturated carbon linkage with an organic compound having a carboxyl group and an aldehyde group in the presence of an acid catalyst, and (b) carbon black.

32 Claims, No Drawings

MODIFIED RUBBER COMPOSITION EMPLOYING A COMPOUND CONTAINING A CARBOXYL AND AN ALDEHYDE GROUP

This invention relates to a modified rubber composition having excellent green strength and excellent properties after vulcanization.

It is known to use a rubber having incorporated therein a polar group such as a carboxyl group, for example a rubber having maleic anhydride or glyoxal added thereto, as a rubber component for the purpose of obtaining a rubber composition having improved green strength and improved adhesion, etc. after vulcanization. Such a rubber, however, has the defect that its vulcanizate does not have sufficient strength properties because during the modification reaction, side-reactions such as gellation of the rubber or a reduction in its molecular weight tend to take place. In particular, even when a polar group such as a carboxyl group is introduced into synthetic polyisoprene rubber having a structure closest to natural rubber by methods known heretofore, the modified rubber is difficult to use in tires of large-sized buses and tracks, etc. because of the aforesaid defect.

It is an object of this invention to provide a modified rubber composition free from these defects.

According to this invention, the above object is achieved by a composition comprising (a) a modified rubber obtained by reacting a rubber having an unsaturated carbon linkage with an organic compound having a carboxyl group and an aldehyde group in the presence of an acid catalyst and (b) carbon black. This composition has excellent green strength and its vulcanization product has excellent strength properties, rebound, etc.

Examples of the rubber having an unsaturated carbon linkage (to be sometimes referred to as an unsaturated rubber or simply a rubber hereinafter) used for the preparation of the modified rubber used in the present invention include homopolymers of conjugated dienes such as butadiene, isoprene, piperylene, 2,3-dimethylbutadiene and chloroprene, copolymers of two or more of these conjugated dienes, copolymers of these conjugated dienes with other monomers, ring-opened polymers of cycloolefins such as cyclopentene and norbornene, polymers of dienes such as ethylidene norbornene and cyclopentadiene, and polyolefin rubbers such as copolymers of the aforesaid dienes and olefins. Typical examples include natural rubber (hevea), guayule rubber, synthetic polyisoprene rubbers (to be sometimes referred to as synthetic IR hereinafter), polybutadiene rubber (to be sometimes referred to hereinafter as BR), a styrene-butadiene copolymer rubber (to be sometimes referred to as SBR hereinafter), a butadiene-isoprene copolymer rubber, an isoprene-styrene copolymer rubber, a butadiene-isoprene-styrene copolymer rubber, a butadiene-piperylene copolymer rubber, a butadiene-propylene alternate copolymer rubber, polypentenamer, an ethylene-propylene-diene copolymer rubber, butyl rubber, a butadiene-acrylonitrile copolymer rubber, a butadiene-isoprene-acrylonitrile copolymer rubber, polychloroprene rubber, a styrene-butadiene-styrene block copolymer rubber, and a styrene-isoprene-styrene block copolymer rubber. The rate of reaction is generally high when a homopolymer or copolymer of isoprene, a homopolymer or copolymer of piperylene and an ethylene-propylene-diene copolymer rubber are used.

The organic compound containing a carboxyl group and an aldehyde group used in this invention is a compound containing at least one of each of these groups, and includes linear aliphatic compounds having up to about 20 carbon atoms, aromatic compounds having rings such as a benzene, naphthalene, pyridine or furane ring, and an alicyclic compound having such a ring as a cyclopentane, cyclopentene or cyclohexane ring. These compounds may, as desired, contain an oxygen atom, a sulfur atom, a nitrogen atom, or a multiple bond in the molecular chains. Alternatively, the hydrogen atom in the molecule may, as desired, be substituted by a halogen atom, an alkyl group, an alkoxy group, an acyl group, a hydroxyl group, a nitrile group, an amino group, etc. if the substitution does not adversely affect the reaction.

More specifically, the aliphatic compounds include glyoxylic acid, formylacetic acid, 2-formylacrylic acid, 6-formylhexanoic acid, 8-formyloctanoic acid, formylmethoxyacetic acid, 2-formylethylacetic acid, and 3-(carbomethoxy)propionaldehyde. The aromatic compounds include 2-, 3- or 4-carboxybenzaldehyde, 2-formyl-5-acetyl-benzoic acid, 2-, 3- or 4-formylphenylacetic acid, 2-formyl-5-hydroxyphenylacetic acid, 3-(2-formylphenyl)propionic acid, 2-formylcinnamic acid, 1,8-naphthaldehyde acid, 2-, 3- or 4-formylphenoxyacetic acid, 2-formyl-4-methylphenoxyacetic acid, 2-(2-formylphenoxy)propionic acid, 3-(2-formylphenoxy)propionic acid, 2-formyl-1-phenoxyisovaleric acid, 6-(2-, 3- or 4-formylphenoxy)hexanoic acid, (2-formylphenyl)-methoxyacetic acid, 2-, 3- or 4-formylphenylthioacetic acid, (1-formyl-2-naphthyloxy)acetic acid, [(5-formyl-2-furyl)thio]acetic acid, (8-formyl-2-oxo-2H-1-benzopyran-7-yl-oxy)acetic acid, 2-, 3- or 4-carboxyphenoxyacetaldehyde, and 2-(formylmethoxy)-phenoxyacetic acid. The alicyclic compounds include 2- or 3-formylcyclopentanecarboxylic acid, 4-formyl-2-cyclopentenecarboxylic acid and 2-formylcyclohexanecarboxylic acid.

Among these organic compounds, those having such a structure that the carboxyl group and the aldehyde group therein are easy of three-dimensionally or thermodynamically approaching each other moderately in the molecule through an acid catalyst, particularly compounds having an aromatic ring in which the carboxyl group or an atomic grouping containing this group and the aldehyde group or an atomic grouping containing this group are located adjacent to each other on the ring (at the ortho-position when the ring is a benzene ring), are especially preferred in this invention because they lead to a high rate of reaction.

Furthermore, those organic compounds having a carboxyl and an aldehyde group which contain a large amount of a non-polar or a relatively weakly polar hydrocarbon moiety, or those which have a low melting point are suitable for the reaction operation because they have a high solubility in hydrocarbon solvents.

The amount of the organic compound having a carboxyl and an aldehyde group is not particularly restricted. Usually, it is 0.01 to 20 parts by weight, preferably 0.1 to 5 parts by weight, per 100 parts by weight of the unsaturated rubber.

The acid catalyst used in the preparation of the modified rubber in the present invention is selected from protonic acids such as sulfuric acid, nitric acid, chlorosulfonic acid, p-toluenesulfonic acid and hydrohalic acids and usually known Lewis acids. Typical examples of the Lewis acids are halides of metals or semi-metals, for example halogen compounds or organic halogen compounds of elements such as Be, B, Al, Si, P, S, Ti, V, Fe, Zn, Ga, Ge, As, Se, Zr, Nb, Mo, Cd, Sn, Sb, Te, Ta, W, Hg, Bi and U or oxygen-element combinations such as PO, SeO, So, $SO_2$ or VO, and complexes of these. Preferred acid catalysts are those which form a coordination bond with the organic compounds having a carboxyl and an aldehyde group. Especially preferred are those acid catalysts whose coordination products with the organic compounds have an orange color (absorption wavelength 480 nm) or a deeper color. Specific examples include $BF_3$, $(CH_3)_2BF$, $BCl_3$, $AlCl_3$, $AlBr_3$, $(C_2H_5)AlCl_2$, $POCl_3$, $TiCl_4$, $VCl_4$, $MoCl_5$, $SnCl_4$, $(CH_3)SnCl_3$, $SbCl_5$, $TeCl_4$, $TeBr_4$ and $WCl_6$. Of these, $SnCl_4$, $BCl_3$, $WCl_6$ and $SbCl_5$ are especially suitable because they lead to a high rate of reaction and cause little side-reactions such as the gellation of the rubber. It is of course possible to use two or more species of each of the protonic acid and the Lewis acid, or to use the protonic acid in combination with the Lewis acid.

There is no particular restriction on the amount of the acid catalyst used. Usually, it is 0.01 to 5 moles, preferably 0.05 to 2 moles, per mole of the organic compound having a carboxyl and an aldehyde group.

The reaction for the preparation of the modified rubber in this invention is carried out usually in the presence of a suitable solvent, or in a rubber kneading machine in the absence of a solvent. Industrially, the reaction is advantageously carried out in the rubber cement after the end of the polymerization. The solvent may, for example, be an aromatic solvent such as benzene or toluene, a paraffinic solvent such as butane or hexane, or a halogenated hydrocarbon solvent such as chloroform or dichloroethane. Suitable solvents are those which are inert to the acid catalyst, etc. and dissolve the rubber. Solvents which have some degree of solubilizing power for the organic compound having a carboxyl and an aldehyde group or the acid catalyst are especially suitable from the viewpoint of the rate of reaction, etc., but useful solvents are not limited to these particular solvents alone.

The organic compound having a carboxyl and an aldehyde group and the acid catalyst may be separately added to the reaction system, or after they are mixed in advance (in which case a chemical change may occur). All of the acid catalyst may be added in the initial stage of the reaction, or it may be added portionwise or continuously during the reaction.

When the reaction is carried out using a Lewis acid as a catalyst, the reaction system is preferably kept in an anhydrous condition or at a limited water content in order to maintain the activity of the catalyst and to prevent side-reactions such as excessive gellation or cyclization of the rubber. Furthermore, the presence of oxygen is usually not preferred.

The reaction temperature is not particularly restricted. Usually, it is $-20°$ C. to $200°$ C., preferably $0°$ C. to $100°$ C. The reaction time is suitably prescribed between 10 seconds and 50 hours.

When the reaction is carried out in the solvent, the addition of, for example, a large amount of alcohol or hot water can lead to the stopping of the reaction and the coagulation of the rubber. As required, the remaining acid catalyst and other materials are removed by washing, and the residue is dried to give a modified rubber.

The kind of carbon black to be blended with the modified rubber obtained as above is not particularly restricted. Preferably, however, it has an average particle diameter of 10 m$\mu$ to 500 m$\mu$. The carbon black is selected from channel black of various grades such as EPC, MPC, HPC and CC, furnace black of various grades such as SAF, ISAF, HAF, MAF, FEF, HMF, SRF, SPF, GPF, APF, FF and CF, thermal black of various grades such as FT and MT, and acetylene black. The amount of carbon black used is selected, depending upon the end use of the rubber composition, usually from 1 to 200 parts by weight, preferably 10 to 120 parts by weight, per 100 parts by weight of the modified rubber.

As desired, the composition of this invention may include ordinary rubber compounding agents such as vulcanizing agents, vulcanization accelerators, vulcanization aids, softening agents, tackifiers, fillers, reinforcing agents other than carbon black, and antioxidants.

Sulfur and sulfur-donors of the thiuram and thiazole series are typical vulcanizing agents. Peroxides, polyamines, metal oxides, urethan vulcanizers and resin vulcanizers can also be used as desired. Examples of the vulcanization accelerators are compounds of the sulfenamide, thiuram, thiazole, guanidine, mercaptotriazine, and aldehyde-amine series. Examples of the vulcanization aids are carboxylic acids such as stearic acid and oleic acid, and metal compounds such as zinc stearate, zinc oxide, magnesium oxide, calcium hydroxide and lead carbonate. Process oils of the paraffinic, naphthenic and aromatic series may be used as the softening agents, and compounds of the rosin, petroleum hydrocarbon resin, coumarone resin, and phenol-terpene resin series may be used as the tackifiers. The fillers include calcium carbonate, clay and talc. Silicic acid and its salts may be used as the reinforcing agents other than carbon black. Examples of the antioxidants are amine compounds and phenolic compounds. The aforesaid vulcanization accelerators and vulcanization aids are used mainly in the case of vulcanization with sulfur or sulfur donors.

As required, the modified rubber composition of this composition may include other rubbers in a desired proportion. A blended rubber composed of a modified rubber obtained by using a rubber selected from synthetic IR, a copolymer rubber of a major proportion of isoprene and a minor proportion of a comonomer such as butadiene and styrene, natural rubber (hevea) and guayule rubber (in the present invention, these rubbers may sometimes be generically referred to as a polyisoprene rubber) as the rubber having an unsaturated carbon linkage, and another diene-type rubber is especially suitable for use in tires. Generally, this blended rubber consists of 5 to 95% by weight of the modified rubber and 95 to 5% by weight of the other diene-type rubber.

Examples of the other diene-type rubber as a constituent of the blended rubber include natural rubber (hevea), guayule rubber, synthetic IR, BR, SBR, a butadiene-piperylene copolymer rubber, a butadiene-acrylonitrile copolymer rubber, an isoprene-acrylonitrile copolymer rubber, high-styrene rubber, and an ethylene-propylene-diene copolymer rubber. These diene rubbers may be used as a mixture of two or more. These diene-type rubbers are selected properly according to the purpose of addition and the end use of the rubber composition. For tire applications, BR, SBR, natural rubber, BR plus SBR, BR plus natural rubber and SBR plus natural rubber are most typical and produce a marked effect. An example of BR is a rubber having a vinyl linkage content of 0 to 98% and a trans- 1,4 linkage content of 0 to 95% prepared by solution polymerization of butadiene in the presence of an ordinary catalyst such as a Ziegler catalyst or an organic alkali metal catalyst. An example of SBR is a rubber having a sytrene linkage content of 5 to 40% by weight and a vinyl linkage content in the butadiene moiety of 0 to 98% by weight prepared by usual emulsion or solution polymerization of styrene and butadiene.

Among blended rubber compositions in accordance with this invention, a composition composed of (a) 100 parts by weight of a blended rubber consisting of 75 to 95% by weight of modified synthetic IR and 25 to 5% by weight of BR having a vinyl linkage content of 0 to 50% and/or SBR having a styrene linkage content of 15 to 35% and a vinyl linkage content in the butadiene moiety of 0 to 50% and (b) 45 to 70 parts by weight of furnace carbon black having an average particle diameter of 10 to 50 m$\mu$ has excellent rebound, low heat build-up, excellent resistance to cracking upon bending, and other good properties, and is suitable for use in a tire tread for large-sized tracks and buses. A composition composed of (a) 100 parts by weight of a blended rubber consisting of 5 to 35% by weight of modified synthetic IR and 95 to 65% by weight of SBR having a styrene linkage content of 15 to 35% and a vinyl linkage content in the butadiene moiety of 0 to 50% and (b) 45 to 70 parts by weight of furnace carbon black having an average particle diameter of 10 to 50 m$\mu$ has excellent rebound, tensile stress, resistance to cracking upon bending, and other good properties, and is suitable for use as a tire tread for automobiles. A composition composed of (a) 100 parts by weight of a blended rubber consisting of 35 to 65% by weight of modified synthetic IR and 65 to 35% by weight of BR having a vinyl linkage content of 0 to 50% and/or SBR having a styrene linkage content of 15 to 35% by weight and a vinyl linkage content in the butadiene moiety of 0 to 50% and (b) 40 to 50 parts by weight of furnace carbon black having an average particle diameter of 25 to 70 m$\mu$ has high rebound, low heat build-up, and excellent tensile stress, and is suitable, for example, for use in a tire side wall. A composition composed of (a) 100 parts by weight of a blended rubber consisting of 50 to 95% by weight of modified synthetic IR and 50 to 5% by weight of BR having a vinyl linkage content of 0 to 50% and/or SBR having a styrene linkage content of 15 to 35% and a vinyl linkage content in the butadiene moiety of 0 to 50% and (b) 40 to 50 parts by weight of furnace carbon black having an average particle diameter of 40 to 90 m$\mu$ has high green strength, tackiness and rebound, and low heat build-up, and is suitable for use in a tire carcass. A composition composed of (a) 100 parts by weight of a blended rubber consisting of 80 to 95% by weight of modified synthetic IR and 20 to 5% by weight of BR having a vinyl linkage content of 0 to 50% and/or SBR having a styrene linkage content of 15 to 35% by weight and a vinyl linkage content in the butadiene moiety of 0 to 50% and (b) 70 to 100 parts by weight of furnace carbon black having an average particle diameter of 10 to 40 m$\mu$ has high rebound and tensile stress, and is suitable for use in a tire bead filler or a rim cushion. A composition composed of (a) 100 parts by weight of a blended rubber consisting of 75 to 25% by weight of modified synthetic IR and 25 to 75% by weight of BR having a vinyl linkage content of 35 to 98% and/or SBR having a styrene linkage content of 5 to 35% by weight and a vinyl linkage content in the butadiene moiety of 30 to 85% and (b) 40 to 70 parts by weight of furnace carbon black having an average particle diameter of 10 to 50 m$\mu$ has especially high wet skid resistance and high rebound, and is suitable for use as a tread of tires of low fuel consumption.

The various components constituting the composition of this invention may be mixed by any desired methods. Usually, this is effected by using various rubber kneading machines. In particular, carbon black and a process oil may be mixed with rubber in the process of producing the starting rubber or in the process of modifying it to form a carbon master batch or an oil master batch. The aforesaid other rubber may be caused to be present during the modification of the rubber.

Since the modified rubber composition of this invention has an excellent green strength in the unvulcanized state and excellent dynamic properties such as tear strength, fatigue resistance and rebound after vulcanization, it finds suitable applications in tires, carcasses, treads, side walls, bead fillers and inner liners for automobiles, tracks and buses; various kinds of antivibration rubbers; industrial belts; hoses and footwear and rubber-coated fabrics.

The following examples illustrate the present invention more specifically. In these examples, the following methods were used in analyzing modified rubbers, preparing unvulcanized compounds of the modified rubbers and their vulcanizates, and testing their properties.

Amount of the organic compound having a carboxyl and an aldehyde group (to be sometimes referred to simply as the organic compound hereinafter) introduced into rubber Determined by utilizing the absorption at a wavelength of 275 nm of the aromatic ring of the organic compound added to rubber molecules with a gel-permeation chromatographic device equipped with an ultraviolet absorption spectral detector.

Amount of the carboxyl group introduced into rubber

Low-molecular components are removed from the rubber, and then the amount of the carboxyl group introduced into the rubber is measured by the neutralization titration method.

Preparation of an unvulcanized rubber compound

A modified rubber is kneaded with various compounding ingredients in the recipe shown in each example excepting sulfur and the vulcanization accelerator. The resulting mixture is kneaded with sulfur and the vulcanization accelerator on a small-sized roll mill to prepare an unvulcanized rubber compound.

Wallace plasticity

Measured at 100° C. by the Wallace's rapid plastometer.

Green strength

An unvulcanized rubber compound is press-formed at 100° C. for 5 minutes to produce a 2 mm-thick unvulcanized rubber sheet. A dumbbell-shaped specimen (according to JIS No. 3) is punched out, and subjected to a tensile test at a temperature of 25° C. and a tensile speed of 500 mm/min. The tensile stress at 500% stretch is measured.

Tackiness

A specimen, 6.35 mm wide and 50 mm long, is punched out from a 2 mm-thick sheet obtained by press-forming an unvulcanized rubber compound at 100° C. for 3 minutes, and its tackiness is measured at a temperature of 23° C. under a load of 16 psi with an adhesion time of 1 minute by using a Monsanto TEL-TAK meter.

Vulcanization speed

The time ($T_{95}$) which elapses until the torque measured at 145° or 150° C. by an oscillating disc rheometer reaches 95% of the maximum torque is measured.

Tensile test

A 2 mm-thick sheet is obtained by pressing and vulcanizing an unvulcanized rubber compound at 145° or 150° C. for a predetermined period of time. A dumbbell-shaped No. 3 test specimen stipulated in JIS-K 6301 is punched out from the sheet and subjected to a tensile test at a temperature of 25° C. and a tensile speed of 500 mm/min.

Tear strength

A rectangular test specimen, 15 mm wide and 100 mm long, is punched out from a 2 mm-thick vulcanized rubber sheet, and a 6 mm cut is provided at the center of one side edge in the longitudinal direction at right angles to the side edge by means of a safety razor blade. This specimen is tested for tear strength at 25° C. and a tensile speed of 500 mm/min. Three such test specimens are taken from the rubber sheet in the longitudinal direction thereof, and another three in a direction at right angles to the longitudinal direction, and an average of the measured values of the six specimens is obtained.

Heat build-up (HBU)

In accordance with ASTM D623-58, a cylindrical vulcanized rubber specimen, 0.7 inch in diameter and 1 inch height is used, and a temperature rise (°C.) is measured by a Goodrich tester under the following conditions.

Number of vibrations: 1800 rpm
Load: 25 pounds
Stroke: 0.175 inch
Testing temperature: 100° C.
Testing time: 25 minutes Blow-out time In accordance with ASTM D623-58, a cylindrical vulcanized rubber specimen, 0.7 inch in diameter and 1 inch in height, is used, and the time in minutes which elapses until the specimen breaks due to fatigue is measured by a Goodrich tester under the following conditions.

Number of vibrations: 1800 rpm
Load: 50 pounds
Stroke: 0.25 inch
Testing temperature: 100° C.

Rebound

In Examples 1 to 5, it is measured at 25° C. by using a Dunlop Tripso Meter. In Examples 6 to 10, it is measured at 23° C. in accordance with the testing method described in JIS K-6301.

Flex life in a W groove

By the method described in W. Kern: Kautschuck und Gummi, 8 195 (1955), the number of bending cycles on a test specimen which are performed until a crack formed on the specimen grows to a total length of 12.5 mm is measured.

Pico abrasion

Measured in accordance with ASTM D-2228 by using a Goodrich Pico abrastion tester.

Wet skid resistance

Measured by a portable skid tester (a product of Stanley Company, Britain) at 19° C. on a road surface of ASTM E-303-74 (a black safety walk, outdoor use type B made by 3M Company).

EXAMPLE 1

160 g of synthetic IR (cis-1,4 linkage content 98%) was dissolved in 3 liters of dehydrated toluene, and in a sealed glass vessel (separable flask), each of the organic compounds indicated in Table 1 was added in an atmosphere of nitrogen with stirring at 25° C. Subsequently, $SnCl_4$ in the amount indicated in Table 1 was diluted with 40 times its volume of dehydrated benzene, and added dropwise gradually. The color of the solution at this time was observed. The solution was further stirred for each of the reaction times shown in Table 1, and then 500 ml of methanol was poured into it (whereby, it is presumed, the addition reaction ceased). The resulting rubber solution in a semicoagulated condition was poured into 3 liters of methanol to coagulate the rubber completely. The coagulated product was then attenuated and washed. The coagulated fragments were dipped in 3 liters of methanol containing about 2 g of 2,6-di-tertiary butyl-4-methylphenol as an antioxidant, washed, and dried for a day and night in a vacuum dryer.

In this manner, the modified polyisoprene rubber samples A, B, C, D, E, F and G shown in Table 1 were obtained.

TABLE 1

| Samples | Organic compound | (g) | $SnCl_4$ (g) | Reaction time (minutes) | Amount introduced into rubber (moles/100 g of rubber) | | Color of the solution |
|---|---|---|---|---|---|---|---|
| | | | | | Organic compound | Carboxyl group | |
| A* | None | | 0.23 | 5 | — | — | Colorless |
| B | 2-Formylphenoxy-acetic acid | (3.4) | 2.3 | 4 | 0.0029 | 0.0025 | Reddish violet |
| C | 2-Formylphenoxy-acetic acid | (1.7) | 2.3 | 2 | 0.0016 | 0.0011 | Red |
| D | 2-Formylphenoxy-acetic acid | (3.4) | 0.23 | 5 | 0.0018 | 0.0015 | Red |
| E* | Benzoic acid | (3.4) | 0.23 | 5 | below 0.0002 | below 0.0002 | Pale yellow |
| F* | Benzaldehyde | (3.4) | 0.23 | 5 | below 0.0002 | — | Pale yellow |
| G* | Phthalic acid | (4.6) | 0.23 | 5 | below 0.0002 | below 0.0002 | Pale yellow |

*Comparative samples

The properties of unvulcanized compounds and vulcanizates prepared in accordance with the following compounding recipe were measured, and the results are shown in Table 2.

| Compounding recipe (parts by weight) | |
|---|---|
| Rubber | 100 |

| Compounding recipe (parts by weight) | |
|---|---|
| HAF carbon (Seast 3, a product of Tokai Carbon Co., Ltd.) | 50 |
| Aromatic oil | 5 |
| Zinc oxide | 5 |
| Stearic acid | 2 |
| Sulfur | 2.5 |
| N—oxydiethylene-2-benzothiazyl sulfenamide (vulcanization accelerator) | 0.8 |
| N—isopropyl-N'—phenyl-p-phenylenediamine | 1.0 |

It is seen from Table 2 that the samples B, C and D in accordance with this invention have especially high green strength, tear strength and rebound.

TABLE 2

| | Properties of the unvulcanized composition | | | Properties of the vulcanizate | | | | |
|---|---|---|---|---|---|---|---|---|
| | | | | | Tensile test | | | |
| Sample | Wallace plasticity | Green strength (kg/cm²) | Vulcanization speed T95 (145° C.) (min.) | Vulcanization time (145° C.) (min.) | 300% tensile stress (kg/cm²) | Tensile strength (kg/cm²) | Elongation (%) | Tear strength (kg/cm) | Rebound (%) |
| Synthetic IR (unmodified) | 47.5 | 1.9 | 19 | 24 | 140 | 276 | 520 | 35 | 63 |
| A | 47.0 | 1.9 | 20 | 25 | 148 | 281 | 510 | 35 | 64 |
| B | 43.0 | 64.4 | 21 | 26 | 175 | 270 | 460 | 51 | 74 |
| C | 47.5 | 45.3 | 17 | 22 | 160 | 294 | 490 | 48 | 72 |
| D | 53.0 | 31.9 | 21 | 26 | 172 | 297 | 470 | 47 | 72 |
| E | 45.5 | 2.0 | 21 | 26 | 142 | 273 | 510 | 36 | 66 |
| F | 48.0 | 2.1 | 21 | 26 | 144 | 282 | 520 | 34 | 65 |
| G | 47.5 | 2.0 | 20 | 25 | 141 | 275 | 520 | 35 | 64 |

EXAMPLE 2

Modified polyisoprene rubber samples H, I, J, K, L and M shown in Table 3 were obtained by carrying out the same reaction as in Example 1 except that each of the organic compounds and each of the acid catalysts indicated in Table 3 were used instead of those used in Example 1.

TABLE 3

| Sample | Organic compound (g) | Acid catalyst (g) | Reaction time (minutes) | Amount introduced into rubber (moles/100 g of rubber) | |
|---|---|---|---|---|---|
| | | | | Organic compound | Carboxyl group |
| H | 2-Formylphenoxyacetic acid (1.7) | SbCl$_5$ (1.4) | 20 | 0.0014 | 0.0009 |
| I | 2-(2-Formylphenoxy)-propionic acid (1.8) | SnCl$_4$ (1.2) | 15 | 0.0022 | 0.0015 |
| J | 3-(2-Formylphenoxy)-propionic acid (1.8) | SbCl$_5$ (1.4) | 20 | 0.0019 | 0.0013 |
| K | (1-Formyl-2-naphtyl-oxy) acetic acid (2.2) | SnCl$_4$ (1.2) | 15 | 0.0012 | 0.0007 |
| L | 2-Carboxybenzaldehyde (1.4) | BCl$_3$ (0.55) | 60 | 0.0015 | 0.0006 |
| M | 2-Formylphenoxyacetic acid (1.7) | WCl$_6$ (1.9) | 60 | 0.0012 | 0.0005 |

The properties of the above samples were measured in the same way as in Example 1, and the results are shown in Table 4. The results show that the samples in accordance with this invention have especially high green strength and tear strength.

TABLE 4

| | Properties of the unvulcanized compound | | | | Properties of the vulcanizate | | | |
|---|---|---|---|---|---|---|---|---|
| | | | | | Tensile test | | | |
| Sample | Wallace plasticity | Green strength (kg/cm²) | Vulcanization speed T95 (145° C.) (min.) | Vulcanization time (145° C.) (min.) | 300% tensile stress (kg/cm²) | Tensile strength (kg/cm²) | Elongation (%) | Tear strength (kg/cm) |
| H | 43 | 41.0 | 17.8 | 23 | 152 | 291 | 510 | 45 |
| I | 49.5 | 52.3 | 19.7 | 25 | 176 | 270 | 460 | 50 |
| J | 45.5 | 48.0 | 19.5 | 25 | 160 | 285 | 480 | 42 |
| K | 50 | 33.2 | 18.3 | 24 | 165 | 287 | 490 | 44 |
| L | 48 | 8.6 | 18.5 | 24 | 147 | 279 | 510 | 42 |
| M | 47.5 | 13.8 | 20.3 | 26 | 149 | 271 | 500 | 41 |

EXAMPLE 3

The modified rubber samples N, O and P shown in Table 5 were obtained in the same way as in Example 1 except that the rubbers, organic compounds and acid catalysts shown in Table 5 were used and the reaction was carried out for the time periods indicated in Table 5.

TABLE 5

| Sample | Rubber | Organic compound (g) | Acid catalyst (g) | Reaction time (hours) | Amount introduced into rubber (moles/100 g of rubber) Organic compound | Amount introduced into rubber (moles/100 g of rubber) Carboxyl group |
|---|---|---|---|---|---|---|
| N | BR (cis-1,4 linkage content 98%) | 2-Formyl-phenoxy-acetic acid (4.5) | SnCl$_4$ (3.2) | 24 | 0.0014 | 0.0009 |
| O | Butadiene/isoprene (50/50) copolymer rubber (*) | 2-Formyl-phenoxy-acetic acid (2.9) | SnCl$_4$ (4.2) | 0.5 | 0.0025 | 0.0015 |
| P | Butadiene/isoprene (90/10) copolymer rubber (*) | 2-Formyl-phenoxy-acetic acid (2.9) | SnCl$_4$ (4.2) | 0.5 | 0.0014 | 0.0008 |

(*): Prepared by using a lithium-type catalyst.

The properties of the above samples and the corresponding unmodified rubbers were tested in the same way as in Example 1 except that the compounding recipe (parts by weight) and the vulcanization temperature were partly changed as shown below. The results are shown in Table 6.

| Sample N and the corresponding unmodified rubber: | |
|---|---|
| Zinc oxide | 3 |
| Sulfur | 1.5 |
| Vulcanization accelerator | 1.1 |
| Sample O and the corresponding unmodified rubber: | |
| Zinc oxide | 3 |
| Sulfur | 1.7 |
| Vulcanization accelerator | 1.4 |
| Vulcanization temperature | 160° C. |
| Sample P and the corresponding unmodified rubber: | |
| Zinc oxide | 3 |
| Sulfur | 1.14 |
| Vulcanization accelerator | 1.8 |
| Vulcanization temperature | 160° C. |

TABLE 6

| | Properties of the unvulcanized compound | | | | Properties of the vulcanizate | | | |
|---|---|---|---|---|---|---|---|---|
| | | | | | Tensile test | | | |
| Sample | Mooney viscosity (ML$_{1+4}$, 100° C.) | Green strength (kg/cm$^2$) | Vulcanization speed T$_{95}$ (min.) | Vulcanization time (min.) | 300% tensile stress (kg/cm$^2$) | Tensile strength (kg/cm$^2$) | Elongation (%) | Tear strength (kg/cm) |
| BR (cis-1,4 linkage content 98%) | 67 | 2.1 | 25.8 | 35 | 82 | 170 | 510 | 27 |
| N | 70 | 7.4 | 24.3 | 33 | 96 | 181 | 480 | 30 |
| Butadiene-isoprene (50:50) copolymer rubber | 65.5 | 2.0 | 22.9 | 35 | 163 | 187 | 350 | 31 |
| O | 68 | 10.5 | 23.5 | 35 | 178 | 211 | 380 | 36 |
| Butadiene-isoprene (90:10) copolymer rubber | 60 | 1.9 | 27.9 | 35 | 140 | 177 | 360 | 28 |
| P | 65.5 | 2.8 | 24.7 | 35 | 156 | 196 | 380 | 31 |

It is seen from Table 6 that the modified rubbers obtained by this invention have higher green strength, 300% tensile stress, tensile strength and tear strength than the corresponding unmodified rubbers.

EXAMPLE 4

Rubber compositions were prepared by using the sample D and the unmodified synthetic IR in Example 1 in accordance with the recipes shown in Table 7, and their properties were tested in the same way as in Example 1. The results are also shown in Table 7.

TABLE 7

| Compounding recipe (parts by weight) (the same as in Example 1 except as noted below) | Sample | Properties of the unvulcanized compound | | Vulcanization speed at 145° C. T95 (minutes) | Vulcanization time (min.) at 145° C. | Properties of the vulcanizate | | | | |
|---|---|---|---|---|---|---|---|---|---|---|
| | | Wallace plasticity | Green strength (kg/cm$^2$) | | | Tensile test | | | | |
| | | | | | | 300% Tensile stress (kg/cm$^2$) | Tensile strength (kg/cm$^2$) | Elongation (%) | Tear strength (kg/cm) | Rebound (%) |
| HAF carbon 30 | Unmodified synthetic IR | 35.6 | 1.0 | 23 | 28 | 70 | 284 | 620 | 31 | 74 |
| Aromatic oil 3 | D | 37.5 | 9.1 | 24 | 29 | 82 | 293 | 600 | 44 | 79 |
| HAF carbon 80 | Unmodified synthetic IR | 72.5 | 7.6 | 18 | 23 | 217 | 248 | 340 | 28 | 47 |
| Aromatic oil 8 | D | 73.5 | >50 | 19 | 24 | 221 | 255 | 330 | 32 | 50 |

It is seen from Table 7 that even when the amount of carbon black is varied, the same results as in Example 1 were obtained.

EXAMPLE 5

1.1 g of glyoxylic acid hydrate (OHC—COOH.H$_2$O) was dried and dehydrated at 50° C. under reduced pressure (less than 1 mmHg) for 10 hours, and then dissolved in 100 ml of benzene. A small amount of the insoluble portion was removed.

160 g of synthetic IR (cis-1,4-content 98%) was dissolved in 3 liters of dehydrated n-hexane, and in a sealed glass vessel (separable flask), all of the glyoxylic acid solution prepared as above was added in an atmosphere of nitrogen with stirring at 25° C. Subsequently, 1.5 g of SnCl$_4$ as a benzene solution was gradually added dropwise (the solution turned yellow). The solution was further stirred for 2 hours, and then 50 ml of methanol was poured (whereby, it is presumed, the addition reaction ceased). The resulting rubber solution was poured into 3 liters of acetone to coagulate rubber completely. The coagulated mass was attenuated and washed. The coagulated fragments were dipped in 3 liters of methanol containing about 2 g of 2,6-ditertiary-butyl-4-methylphenol as an antioxidant, washed, and dried for a day and night in a vacuum dryer to give a modified polyisoprene rubber (sample Q).

An infrared absorption spectrum of the purified sample Q was taken, and by comparing its absorbance at 1706 cm$^{-1}$ (C=O) with that at 1660 cm$^{-1}$ (C=O), the amount of the carboxyl group introduced was found to be 0.0013 mole/100 g of rubber.

The properties of an unvulcanized compound and a vulcanizate prepared in accordance with the same compounding recipe as in Example 1 were measured. The results are shown in Table 8.

TABLE 8

| Properties of the unvulcanized compound | |
|---|---|
| Wallace plasticity | 41.5 |
| Green strength (kg/cm$^2$) | 10.3 |
| Vulcanization speed at 145° C., T$_{95}$ (minutes) | 19 |
| Vulcanization time (minutes) at 145°C. | 24 |
| Properties of the vulcanized product | |
| 300% Tensile stress (kg/cm$^2$) | 150 |
| Tensile strength (kg/cm$^2$) | 272 |
| Elongation (%) | 500 |
| Tear strength (kg/cm) | 44 |
| Rebound (%) | 65 |

EXAMPLE 6

160 g of synthetic IR (cis-1,4-linkage content 98%) was dissolved in 3 liters of dehydrated toluene, and in a sealed glass vessel (separable flask), each of the organic compounds shown in Table 9 was added in an atmosphere of nitrogen with stirring at 25° C. Then, each of the acid catalysts indicated in Table 9 was diluted with 40 times its volume of dehydrated benzene, and gradually added dropwise. The mixture was further stirred for each of the reaction times shown in Table 9, and 500 ml of methanol was poured (whereby, it is presumed, the addition reaction ceased). The resulting rubber solution in a semi-coagulated condition was poured into 3 liters of methanol to coagulate the rubber completely. The coagulated mass was attenuated, and washed. The coagulated fragments were dipped in 3 liters of methanol containing about 2 g of 2,6-ditertiary butyl-4-methylphenol as an antioxidant, washed, and then dried for a day and night in a vacuum dryer.

In this manner, the modified rubber samples R, S, T, U, V and W shown in Table 9 were obtained.

TABLE 9

| | Sample | Organic compound (g) | Acid catalyst (g) | Reaction time (minutes) | Amount introduced into rubber (moles/100 g of rubber) | |
|---|---|---|---|---|---|---|
| | | | | | Organic compound | Carboxyl group |
| Comparison | R | Benzoic acid (3.4) | SnCl$_4$ (0.23) | 5 | below 0.0002 | below 0.0002 |
| | S | Benzaldehyde (3.4) | SnCl$_4$ (0.23) | 5 | below 0.0002 | — |
| Invention | T | 2-Formylphenoxyacetic acid (3.4) | SnCl$_4$ (0.23) | 5 | 0.0018 | 0.0015 |
| | U | 2-Formylphenoxyacetic acid (1.7) | SbCl$_5$ (1.4) | 20 | 0.0014 | 0.0009 |
| | V | 2-(2-Formylphenoxy)-propionic acid (1.8) | SnCl$_4$ (1.2) | 15 | 0.0022 | 0.0015 |

TABLE 9-continued

| Sample | Organic compound (g) | Acid catalyst (g) | Reaction time (minutes) | Amount introduced into rubber (moles/100 g of rubber) | |
|---|---|---|---|---|---|
| | | | | Organic compound | Carboxyl group |
| W | Glyoxylic acid (*) | SnCl$_4$ (1.2) | 90 | — | 0.0008 |

(*):0.8 of glyoxylic acid hydrate was dried and dehydrated at 50° C. under reduced pressure (less than 1 mmHg) for 10 hours and then dissolved in benzene. The benzene solution was added.

The properties of unvulcanized compounds and vulcanizates of the samples prepared in accordance with the following compounding recipe were measured. The results are shown in Table 10.

| Compounding recipe (parts by weight) | |
|---|---|
| Sample rubber | 85 |
| SBR-1502 | 15 |
| HAF carbon (Seast 3, a product of Tokai Carbon Co., Ltd.) | 50 |
| Zinc oxide | 5 |
| Stearic acid | 2 |
| Sulfur | 2.5 |
| Aromatic oil | 5 |
| N—oxydiethylene-2-benzothiazyl sulfenamide (vulcanization accelerator) | 0.8 |
| N—isopropyl-N'—phenyl-p-phenylenediamine | 1 | ceased). The resulting rubber solution was poured into 100 liters in total of methanol to coagulate the rubber completely. The coagulated mass was then attenuated, and washed. Then, the coagulated fragments were dipped in several divided portions in 10 liters of methanol containing about 20 g of 2,6-ditertiary butyl-4-methylphenol as an antioxidant, washed, and then dried for a day and night in a vacuum dryer to give a modified synthetic IR sample X.

A composition of the following compounding recipe (parts by weight) which is suitable for tire carcasses was prepared, and tested for various properties. The results are shown in Table 11.

| | |
|---|---|
| Rubber (see Table 11) | 100 |
| Zinc oxide | 3 |
| Aromatic oil | 5 |
| GPF (Seast V, Tokai Carbon Co., Ltd.) | 45 |

TABLE 10

| | | Properties of the unvulcanized compound | | | Properties of the vulcanizate | | | | |
|---|---|---|---|---|---|---|---|---|---|
| | | | | | Tensile test | | | | |
| Run No. | Sample | Wallace plasticity | Green strength (kg/cm$^2$) | Vulcanization speed (150° C.) T$_{95}$ (min.) | Vulcanization time (150° C.) (min.) | 300% Tensile stress (kg/cm$^2$) | Tensile strength (kg/cm$^2$) | Elongation (%) | Tear strength (kg/cm) | Rebound (%) |
| Comparison 1 | Synthetic IR (unmodified) | 48.0 | 1.8 | 16.5 | 18 | 142 | 260 | 490 | 31 | 56.0 |
| 2 | R | 46.5 | 1.8 | 17.3 | 19 | 141 | 262 | 490 | 32 | 56.5 |
| 3 | S | 47.5 | 1.9 | 17.7 | 19 | 146 | 254 | 480 | 31 | 56.0 |
| Invention 4 | T | 51.0 | 27.5 | 18.2 | 20 | 163 | 268 | 470 | 40 | 61.5 |
| 5 | U | 42.5 | 29.2 | 19.1 | 21 | 150 | 270 | 490 | 38 | 58.5 |
| 6 | V | 49.5 | 37.6 | 19.3 | 21 | 157 | 265 | 470 | 37 | 59.0 |
| 7 | W | 41.0 | 7.4 | 18.0 | 20 | 152 | 252 | 480 | 38 | 57.0 |

EXAMPLE 7

2 kg of synthetic IR (cis-1,4 linkage content 98%) was dissolved in 40 liters of dehydrated toluene, and in a sealed stainless steel vessel, 14.4 g of 2-formylphenoxyacetic acid was added in an atmosphere of nitrogen with stirring at 25° C. Subsequently, 20.8 g of SnCl$_4$ was diluted with 40 times its volume of dehydrated benzene and gradually added dropwise. The mixture was kept stirred for 25 minutes, and 1 liter of methanol was poured (whereby, it is presumed, the addition reaction

| | |
|---|---|
| Stearic acid | 2 |
| Sulfuric acid | 3 |
| N—cyclohexyl-2-benzothiazyl sulfenamide (vulcanization accelerator) | 0.8 |
| 2,2,4-Trimethyl-1,2-dihydroquinoline polymer | 1 |

It is seen from Table 11 that the modified rubber blended compositions have higher green strength, higher rebound and lower heat build-up than the corresponding comparative compositions.

TABLE 11

| | | Comparison | | | | Invention | | | |
|---|---|---|---|---|---|---|---|---|---|
| | Run No. | 1 | 2 | 3 | 4 | 5 | 6 | 7 | 8 |
| Rubber | Synthetic IR (unmodified) | 70 | 40 | 20 | 70 | — | — | — | — |
| | Modified synthetic IR (X) | — | — | — | — | 70 | 40 | 20 | 70 |
| | SBR 1502 | 30 | 60 | 80 | — | 30 | 60 | 80 | — |
| | BR (cis-1,4 linkage content 98%) | — | — | — | 30 | — | — | — | 30 |
| Properties of the un- | Mooney viscosity (ML$_{1+4}$) | 62.0 | 62.0 | 62.0 | 61.0 | 67.5 | 65.5 | 65.5 | 64.0 |
| | Green strength (kg/cm$^2$) | 2.0 | 2.0 | 1.8 | 1.8 | 49 | 19 | 8.0 | 47 |

TABLE 11-continued

|  | Run No. | Comparison | | | | Invention | | | |
| --- | --- | --- | --- | --- | --- | --- | --- | --- | --- |
|  |  | 1 | 2 | 3 | 4 | 5 | 6 | 7 | 8 |
| vulcanized compound | Tackiness (PSI) | 34 | 34 | 34 | 33 | 58 | 50 | 45 | 57 |
|  | Vulcanization speed (150° C.) (min.) | 25 | 24 | 25 | 25 | 31 | 33 | 32 | 33 |
|  | Vulcanization time (150° C.) (min.) | 25 | 25 | 25 | 26 | 33 | 33 | 33 | 34 |
| Properties of the vulcanizate | Heat build-up (HBU) (°C.) | 11.3 | 14.4 | 16.5 | 8.4 | 10.9 | 13.8 | 15.5 | 7.8 |
|  | Rebound (%) | 70.5 | 68.0 | 67.0 | 72.0 | 72.0 | 69.0 | 68.0 | 74.0 |
|  | Tensile strength (kg/cm$^2$) | 197 | 192 | 187 | 190 | 195 | 176 | 170 | 195 |
|  | 300% Tensile stress (kg/cm$^2$) | 126 | 127 | 129 | 107 | 126 | 126 | 125 | 111 |
|  | Elongation (%) | 430 | 440 | 410 | 470 | 460 | 410 | 400 | 470 |

EXAMPLE 8

Rubber compositions prepared in accordance with the recipes shown in Table 12 (using the same rubbers as in Example 7) were tested for the various properties shown in Table 12. The results are shown in Table 12.

Runs Nos. 9, 10, 11, 12, 16, 17, 18 and 19 are examples of compounds suitable for tire treads of large-sized tracks or buses. The compositions in accordance with this invention (Runs Nos. 16 to 19) have a high rebound, low heat build-up, a long blow-out time, and a low flex life in a W groove, and are superior to the comparative compositions (Runs Nos. 9 to 12). Runs Nos. 15 and 22 show examples of compounds suitable for tire treads of automobiles. Run No. 22 (invention) has a higher rebound, a higher 30% stress and a lower flex life in a W groove than Run No. 15 (comparison). Run Nos. 13, 14, 20 and 21 are examples of compounds suitable for tire side walls. Runs Nos. 20 and 21 (invention) show a higher rebound, lower heat build-up, a longer blow-out time, a higher 300% tensile stress and a longer flex life in a W groove than Runs Nos. 13 and 14 (comparison).

TABLE 12

|  | Run No. | Comparison | | | | | | | Invention | | | | | | |
| --- | --- | --- | --- | --- | --- | --- | --- | --- | --- | --- | --- | --- | --- | --- | --- |
|  |  | 9 | 10 | 11 | 12 | 13 | 14 | 15 | 16 | 17 | 18 | 19 | 20 | 21 | 22 |
| Compounding recipe | Synthetic IR (unmodified) | 90 | 90 | 90 | 90 | 80 | 50 | 20 |  |  |  |  |  |  |  |
|  | Modified synthetic IR (X) |  |  |  |  |  |  |  | 90 | 90 | 90 | 90 | 80 | 50 | 20 |
|  | SBR |  |  |  |  |  |  | 80 |  |  |  |  |  |  | 80 |
|  | BR | 10 | 10 | 10 | 10 | 20 | 50 |  | 10 | 10 | 10 | 10 | 20 | 50 |  |
|  | SAF (*1) | 50 |  |  |  |  |  |  | 50 |  |  |  |  |  |  |
|  | HAF, HS (*2) |  | 50 |  |  |  |  |  |  | 50 |  |  |  |  |  |
|  | HAF (*3) |  |  | 50 |  | 50 | 50 |  |  |  | 50 |  | 50 | 50 |  |
|  | HAF (*4) |  |  |  |  |  |  | 50 |  |  |  |  |  |  | 50 |
|  | HAF, LS (*5) |  |  |  | 50 |  |  |  |  |  |  | 50 |  |  |  |
|  | Zinc oxide | 5 |  |  |  |  |  | 3 | 5 |  |  |  |  |  | 3 |
|  | Stearic acid | 2 |  |  |  |  |  | 2 | 2 |  |  |  |  |  | 2 |
|  | Sulfur | 2.5 |  |  |  |  |  | 1.75 | 2.5 |  |  |  |  |  | 1.75 |
|  | Aromatic oil | 5 |  |  |  |  |  | 5 | 5 |  |  |  |  |  | 5 |
|  | N—oxydiethylene-2-benzothiazyl sulfenamide | 0.8 | → | → | → | → |  |  | 0.8 | → | → | → |  |  |  |
|  | N—cyclohexyl-2-benzothiazyl sulfenamide |  |  |  |  |  | 1.1 |  |  |  |  |  |  |  | 1.1 |
|  | N—isopropyl-N'—phenyl-p-phenylenediamine | 1 |  |  |  |  |  |  | 1 |  |  |  |  |  |  |
|  | Polymer of 2,2,4-trimethyl-1,2-dihydroquinoline |  |  |  |  |  |  | 1 |  |  |  |  |  |  | 1 |
| Vulcanization speed T$_{95}$ (150° C.) (minutes) |  | 19 | 17 | 17 | 18 | 18 | 19 | 22 | 21 | 19 | 19 | 18 | 19 | 20 | 24 |
| Vulcanization time (150° C.) (minutes) |  | 23 | 20 | 20 | 22 | 22 | 22 | 25 | 24 | 22 | 22 | 22 | 22 | 24 | 27 |
| Properties of the vulcanization | Tensile strength (kg/cm$^2$) | 298 | 297 | 285 | 299 | 270 | 227 | 280 | 287 | 269 | 273 | 277 | 262 | 217 | 267 |
|  | 300% Tensile stress (kg/cm$^2$) | 133 | 171 | 144 | 118 | 142 | 142 | 160 | 157 | 194 | 169 | 144 | 165 | 155 | 172 |
|  | Rebound (%) | 52 | 59 | 60 | 63 | 62 | 63 | 49 | 63 | 67 | 68 | 70 | 67 | 66 | 52 |
|  | Heat build-up (HBU) (°C.) | 24.5 | 17.7 | 17.7 | 16.8 | 18.4 | 22.2 | 31.5 | 23.1 | 17.0 | 16.2 | 15.9 | 17.5 | 21.6 | 31.7 |
|  | Blow-out time (minutes) | — | — | 19.7 | — | 19.0 | 13.5 | — | — | — | 28.4 | — | 28.5 | 21.7 | — |
|  | W groove flex life (cycles × 10$^{-3}$) | 70 | — | 48 | — | 35 | 6.7 | 10 | 80 | — | 91 | — | 46 | 6.7 | 15 |

(*1): Diablack A, a product of Mitsubishi Chemical Co., Ltd.;
(*2): Seast 3H, a product of Tokai Carbon Co., Ltd.;
(*3): Seast 3, a product of Tokai Carbon Co., Ltd.;
(*4): Seast KH, a product of Tokai Carbon Co., Ltd.;
(*5): Seast 300, a product of Tokai Carbon Co., Ltd.

EXAMPLE 9

Compositions suitable for a tire or a bead filler were tested for the various properties shown in Table 13. The rubbers used were the same as those used in Example 2.

It is seen that the composition of this invention has a higher rebound and tensile stress than the comparative composition.

TABLE 13

| | Run No. | 23 (comparison) | 24 (invention) |
|---|---|---|---|
| Compounding recipe | Synthetic IR (unmodified) | 80 | — |
| | Modified synthetic IR (X) | — | 80 |
| | BR | 20 | 20 |
| | HAF carbon (*) | 80 | 80 |
| | Zinc oxide | 5 | 5 |
| | Stearic acid | 2 | 2 |
| | Sulfur | 2.5 | 2.5 |
| | Aromatic oil | 8 | 8 |
| | N—oxydiethylene-2-benzothiazyl sulfenamide | 0.8 | 0.8 |
| | Phenyl β-naphthylamine | 1 | 1 |
| Vulcanization speed T95 (145° C.) (minutes) | | 19 | 22 |
| Vulcanization time (145° C.) (minutes) | | 23 | 26 |
| Properties of the vulcanizate | Tensile strength (kg/cm$^2$) | 220 | 200 |
| | Elongation (%) | 300 | 270 |
| | 100% tensile stress (kg/cm$^2$) | 50 | 62 |
| | Rebound (%) | 40 | 42 |

(*): Seast 3, a product of Tokai Carbon Co., Ltd.

EXAMPLE 10

The rubber compositions prepared in accordance with the compounding recipes shown in Table 14 (examples of compounds suitable for treads of low fuel consumption tires) were tested for the various properties shown in Table 14. The results are also shown in Table 14.

It is seen from Table 14 that the compositions of this invention have nearly equivalent Pico abrasion indices and wet skid resistance to, and a higher rebound than, the comparative composition.

TABLE 14

| | | Comparison | | Invention | |
|---|---|---|---|---|---|
| | Run No. | 25 | 26 | 27 | 28 |
| Compounding recipe | Synthetic IR (unmodified) (*1) | 70 | 50 | — | — |
| | Modified synthetic IR (*2) | — | — | 70 | 50 |
| | Highvinyl BR (*3) | 30 | — | 30 | — |
| | Highvinyl SBR (*4) | — | 50 | — | 50 |
| | Zinc oxide | 5 | 4 | 5 | 4 |
| | Stearic acid | 2 | 2 | 2 | 2 |
| | HAF carbon (*5) | 50 | 50 | 50 | 50 |
| | Aromatic oil | 5 | 10 | 5 | 10 |
| | Sulfur | 2.2 | 2.0 | 2.2 | 2.0 |
| | N—oxydiethylene-2-benzothiazyl sulfenamide | 0.89 | 0.55 | 0.89 | 0.55 |
| | Dibenzothiazyl disulfide | — | 0.3 | — | 0.3 |
| | N—isopropyl-N'—phenyl-p-phenylenediamine | 1 | 1 | 1 | 1 |
| Properties of the vulcanized compound | Green strength (kg/cm$^2$) | 2.2 | 2.0 | 51.0 | 55.0 |
| | Vulcanization speed T95 (145° C.) (minutes) | 19 | 24 | 20 | 25 |
| Vulcanization time (145° C.) (minutes) | | 24 | 29 | 24 | 29 |
| Properties of the vulcanizate | Pico abrasion (× 10$^{-2}$ cc) | 1.86 | 1.95 | 1.84 | 1.98 |
| | Wet skid resistance | 61 | 67 | 62.5 | 67 |
| | Rebound (%) | 54.5 | 51 | 58.5 | 55 |

(*1) and (*2): The same as those used in Example 7;
(*3): vinyl linkage content 70%;
(*4): styrene content 25% by weight, vinyl linkage content in the butadiene moiety 60%;
(*5): Seast 3, a product of Tokai Carbon Co., Ltd.

What is claimed is:

1. A modified rubber composition comprising a blend of (a) a modified rubber obtained by reaction a rubber having an unsaturated carbon linkage with an organic compound having a carboxyl group and an aldehyde group in the presence of an acid catalyst, and (b) carbon black.

2. The composition of claim 1 wherein the rubber having an unsaturated carbon linkage is rubber derived from a diene.

3. The composition of claim 1 wherein the rubber having an unsaturated carbon linkage is an isoprene homopolymer rubber or a copolymer rubber of isoprene with another comonomer.

4. The composition of claim 1 wherein the organic compound having a carboxylic group and an aldehyde group is an aromatic compound.

5. The composition of claim 1 wherein the organic compound having a carboxyl group and an aldehyde group is an organic compound having an aromatic ring in which the carboxyl group or an atomic grouping containing this group and the aldehyde group or an atomic grouping containing this group are located adjacent to each other on the aromatic ring.

6. The composition of claim 1 wherein the organic compound having a carboxyl group and an aldehyde group is 2-formylphenoxyacetic acid.

7. The composition of claim 1 wherein the organic compound having a carboxyl group and an aldehyde group is an aliphatic compound.

8. The composition of claim 1 wherein the organic compound having a carboxyl group and an aldehyde group is an alicyclic compound.

9. The composition of claim 1 wherein the acid catalyst is a Lewis acid.

10. The composition of claim 1 wherein the acid catalyst is a halide of a metal or semi-metal.

11. The composition of claim 1 wherein the acid catalyst is a chloride of tin, boron, tungsten or antimony.

12. The composition of claim 1 wherein the organic compound having a carboxyl group and an aldehyde group is used in an amount of 0.01 to 20 parts by weight per 100 parts by weight of the rubber having an unsaturated carbon linkage.

13. The composition of claim 1 wherein the acid catalyst is used in an amount of 0.01 to 5 moles per mole of the organic compound having a carboxyl group and an aldehyde group.

14. The composition of claim 1 wherein the reaction is carried out in the presence of a solvent.

15. The composition of claim 1 wherein the reaction is carried out at a temperature of 0° to 100° C.

16. The composition of claim 1 wherein the amount of carbon black is 1 to 200 parts by weight per 100 parts by weight of the modified rubber.

17. A blended rubber composition comprising (a) a blended rubber composed of 5 to 95% by weight of a modified polyisoprene rubber obtained by reacting a polyisoprene rubber with an organic compound having a carboxyl group and an aldehyde group in the presence of an acid catalyst and 95 to 5% by weight of another rubber derived from a diene, and (b) carbon black.

18. The composition of claim 17 wherein the polyisoprene rubber is a synthetic polyisoprene rubber selected from a homopolymer of isoprene and copolymers of isoprene with other comonomers.

19. The composition of claim 17 wherein the organic compound having a carboxyl group and an aldehyde group is an aromatic compound.

20. The composition of claim 17 wherein the organic compound having a carboxyl group and an aldehyde group is an organic compound having an aromatic ring in which the carboxyl group or an atomic grouping containing this group and the aldehyde group or an atomic grouping containing this group are located adjacent to each other on the aromatic ring.

21. The composition of claim 17 wherein the organic compound having a carboxyl group and an aldehyde group is 2-formylphenoxyacetic acid.

22. The composition of claim 17 wherein the organic compound having a carboxyl group and an aldehyde group is an aliphatic compound.

23. The composition of claim 17 wherein the organic compound having a carboxyl group and an aldehyde group is an alicyclic compound.

24. The composition of claim 17 wherein the acid catalyst is a Lewis acid.

25. The composition of claim 17 wherein the acid catalyst is a halide of a metal or semi-metal.

26. The composition of claim 17 wherein the acid catalyst is a chloride of tin, boron, tungsten or antimony.

27. The composition of claim 17 wherein the organic compound having a carboxyl group and an aldehyde group is used in an amount of 0.01 to 20 parts by weight per 100 parts by weight of the rubber having an unsaturated carbon linkage.

28. The composition of claim 17 wherein the acid catalyst is used in an amount of 0.01 to 5 moles per mole of the organic compound having a carboxyl group and an aldehyde group.

29. The composition of claim 17 wherein the reaction is carried out in the presence of a solvent.

30. The composition of claim 17 wherein the reaction is carried out at a temperature of 0° to 100° C.

31. The composition of claim 17 wherein the other rubber derived from a diene is at least one member selected from polybutadiene rubber, styrene-butadiene copolymer rubber and natural rubber.

32. The composition of claim 17 wherein the amount of carbon black is 1 to 200 parts by weight per 100 parts by weight of the blended rubber.

* * * * *

UNITED STATES PATENT AND TRADEMARK OFFICE
CERTIFICATE OF CORRECTION

PATENT NO. : 4,412,031
DATED : October 25, 1983
INVENTOR(S) : Shizuo Kitahara et al.

It is certified that error appears in the above-identified patent and that said Letters Patent is hereby corrected as shown below:

On the title page add:

-- [30]     Foreign Application Priority Data

Feb. 19, 1982   [JP]   Japan.........57-25477

Jan. 18, 1983   [JP]   Japan.........58-6187        --.

Signed and Sealed this

Thirty-first Day of January 1984

[SEAL]

Attest:

GERALD J. MOSSINGHOFF

Attesting Officer    Commissioner of Patents and Trademarks